April 26, 1966     K. J. AVERSTEN     3,247,807
RAIL CAR FOR PORTABLE EQUIPMENT

Filed Oct. 22, 1962     3 Sheets-Sheet 1

INVENTOR
KARL J. AVERSTEN

BY *Larson and Taylor*

ATTORNEYS

April 26, 1966  K. J. AVERSTEN  3,247,807
RAIL CAR FOR PORTABLE EQUIPMENT
Filed Oct. 22, 1962  3 Sheets-Sheet 2

INVENTOR
KARL J. AVERSTEN

BY *Larson and Taylor*
ATTORNEYS

April 26, 1966   K. J. AVERSTEN   3,247,807
RAIL CAR FOR PORTABLE EQUIPMENT
Filed Oct. 22, 1962   3 Sheets-Sheet 3

INVENTOR
KARL J. AVERSTEN

BY *Larson and Taylor*
ATTORNEYS 3,247,807
RAIL CAR FOR PORTABLE EQUIPMENT
Karl Joel Aversten, Lidingo, Sweden, assignor to Svenska Aktiebolaget Gasaccumulator, Lidingo, near Stockholm, Sweden, a corporation of Sweden
Filed Oct. 22, 1962, Ser. No. 232,094
Claims priority, application Sweden, Oct. 27, 1961, 10,692/61
2 Claims. (Cl. 105—162)

The present invention relates to a rail car for the transporting of portable equipment such as portable grinders, welding apparatus, drills, etc. For purposes of explanation, the present invention is described and shown as being utilized to transport portable welding apparatus of the type comprising a driving engine, a generator driven by the same, and an electrical battery. According to Swedish Patent No. 159,230 (U.S. 2,661,428) the driving engine, generator and battery are mounted in a row within the area of the car which is between the wheels running on the one and on the other rail, i.e., in the transverse direction relative to the direction in which the car moves. This results in an even loading on the car but makes the whole of the welding apparatus rather bulky when it has to be removed from the track to allow passage of a track-borne vehicle and when it subsequently becomes necessary to replace the apparatus on the track.

The object of the invention is to provide a construction of welding apparatus by which it can be easily and conveniently carried and lifted manually for removal or replacement of the same on the track. According to the invention, the driving engine, generator and battery are mounted in a row with the longitudinal direction coinciding with that of the track and vertically above the wheels running on one and the same rail, the wheels being mounted entirely underneath the frame of the car, which is provided with a pair of handles for lifting and carrying the apparatus, one of which is located immediately outside of the driving engine and the other of which immediately outside of the battery at the level of the upper part thereof.

The invention is illustrated by an embodiment shown on the attached drawing.

Figure 1:
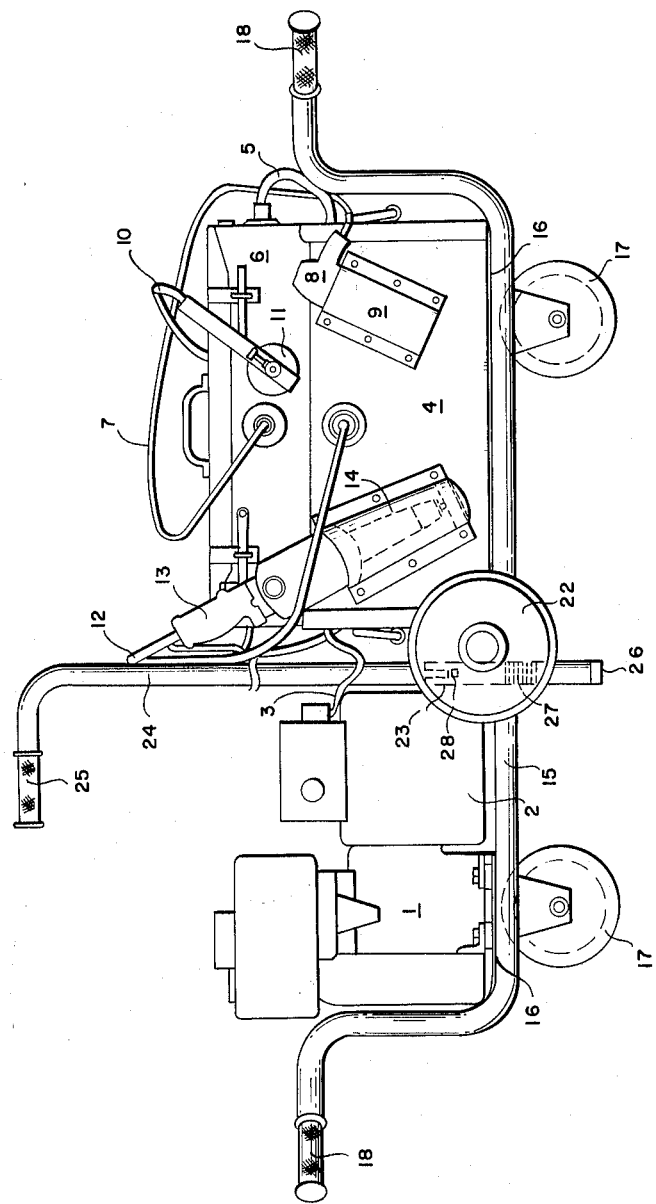
Figure 2:
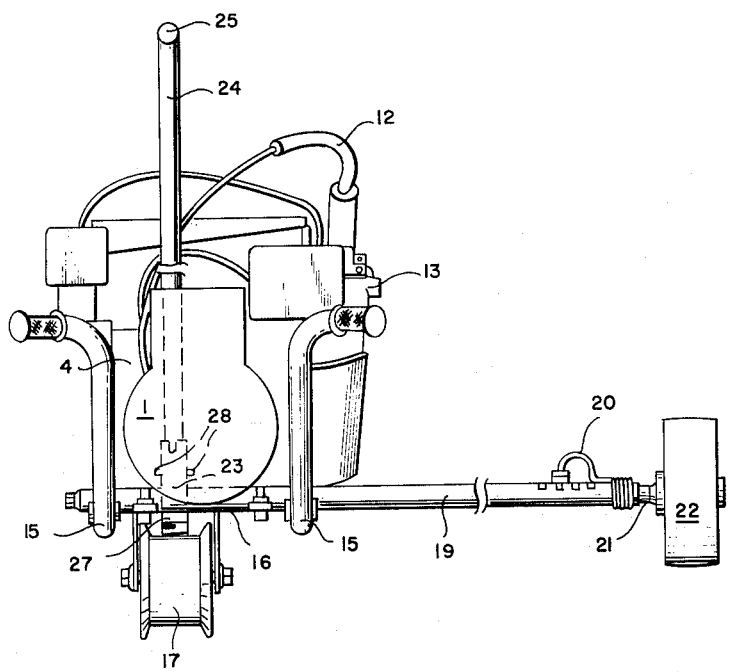
Figure 3:
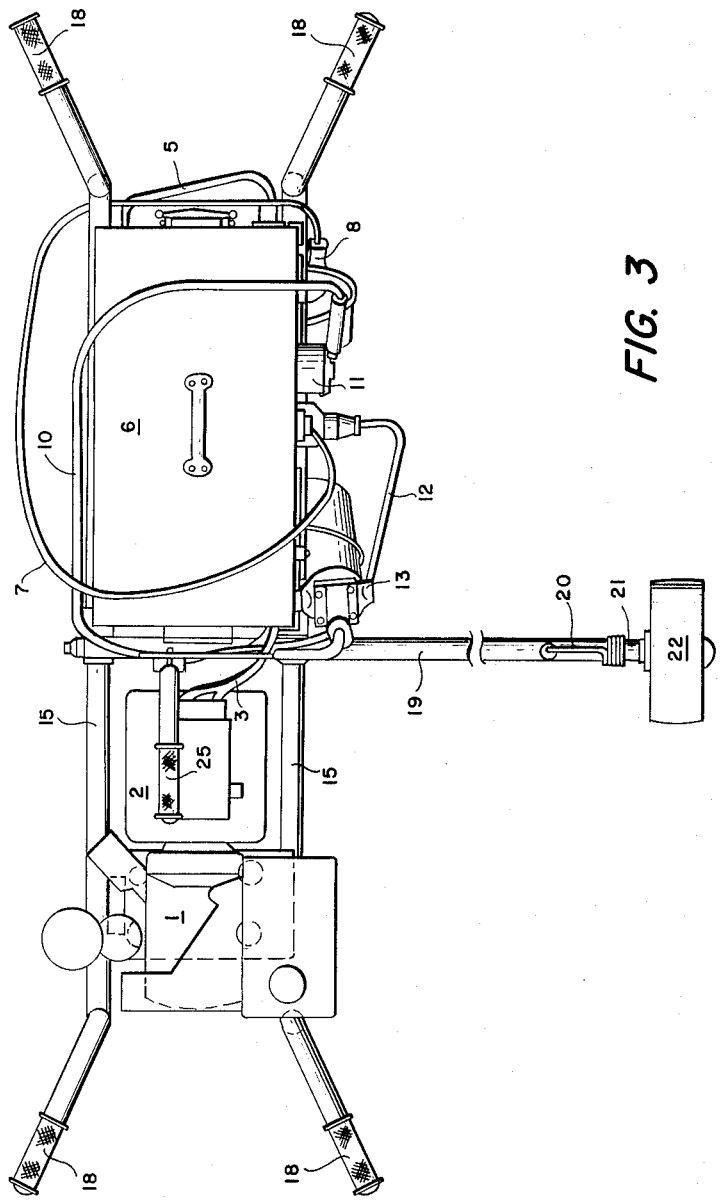

FIGURES 1 and 2 are different lateral views of the welding apparatus of the invention. FIGURE 3 is a plan view thereof.

A driving engine 1 in the form of a gasoline motor has its axle connected to the axle of an electric generator 2, the leads 3 of which are connected to the positive and the negative terminal of an electric battery 4, which is formed by three electric accumulators. The positive terminal of the battery is connected by a lead 5 to a current control (not shown) placed in a box 6 on top of the battery 4 and from which an electric conductor 7 leads to a welding electrode 8. The electrode can be suspended in a support 9 on the outside of the battery. The negative terminal of the battery is connected through a conductor 10 to a magnetic grounding device 11. Also connected to the battery 4 by means of a lead 12 is a grinder 13 for cleaning the welding point before the operation. The grinder can be suspended in a support 14, also mounted on the outside of the battery 4.

The driving engine 1, generator 2 and battery 4 are mounted in a row on a car, the bottom of which is formed on the one hand by a pair of parallel bars or tubes 15 having a mutual spacing corresponding to the width of the battery 4, on the other hand a pair of plates 16 which are welded to the tubes 15. Underneath each of the plates 16 there is provided a double-flanged wheel 17, these wheels 17 being adapted to run on the same rail. The end portions of the tubes 15 extend upwardly and are provided with handles 18 immediately outside the driving engine and outside the battery at a level with the top thereof. Approximately at the midpoint of the tubes 15 there is attached a horizontally extending crosspiece of rod shape and which is formed by a tube 19 welded to the tubes 15 and by a shaft 21 supporting a wheel 22 at its outer end. The shaft is adjustably mounted in the tube 19 and held in position by a spring-actuated catch 20. As is apparent from FIGS. 1 and 2, the lowest point of the circumference of the wheel 22 is at a somewhat higher level than the corresponding point of the wheels 17 if the bottom of the car and the crosspiece 19, 21 are in a horizontal position, as a result of which the driving engine, generator and battery have a slight inward inclination in the direction of the crosspiece when the wheels are mounted on a pair of rails which are at the same level.

Attached to the part of the crosspiece 19 between the tubes 15 is a sleeve 23, in which a substantially vertically disposed rod 24 is mounted so as to extend upwardly somewhat above the highest point of the welding apparatus and having a drive handle 25 formed at the end thereof. The lower end of the rod 24 forms a brake shoe 26. A helical spring 27 acts on the rod 24 so as to press the brake shoe 26 against the rail on which the wheels 17 rest. The rod 24 is provided with pins 28, by means of which it can be held in a lifted position in which the brake pressure is removed, the pins being adapted to engage the upper rim of the sleeve 23 or notches provided in the rim.

It will be apparent that the car construction described is simple to manufacture and that the welding device can be easily mounted on the car. The entire welding apparatus can then be placed with the wheels 17, 22 on a pair of rails and the wheel 22 can easily be adjusted in accordance with the gauge of the track. The apparatus can be moved by a person walking beside it along the track and holding the driving handle 25, the pins 28 of the rod 24 being then in engagement with the upper rim of the sleeve 23, so that the brake shoe 26 is inoperative. When no transportation is desired, the pins 28 are caused to be disengaged from the sleeve and the spring 27 causes the brake shoe 26 to be pressed against the rail. The grounding shoe 11 is placed in contact with the rail and the apparatus is ready for a welding operation. If a track-borne vehicle has to pass the point where the welding apparatus is, all that is necessary is for a few persons to take hold of the handles 18 and remove the whole welding apparatus from the track, this operation being substantially facilitated by the fact that the driving engine, generator and battery are mounted in a row between the two pairs of handles as well as the fact that the welding electrode and the grinder are suspended in supports mounted on the battery. Furthermore, the persons standing between the handles 18 are not inconvenienced by the position of the wheels 17.

What is claimed is:
1. A rail car for a portable welding apparatus comprising: a pair of parallel rod members, at least two horizontally disposed members extending between and connected to said rod members to form a longitudinal platform area upon which a welding apparatus can be mounted, means mounting a pair of aligned flanged rail wheels under respective ones of said horizontally disposed members with their axes of rotation disposed perpendicular to the axes of said rod members for rolling movement on a single rail, the end portions of said rod members extending upwardly beyond said horizontally disposed members and forming pairs of carrying handles at opposite ends of the car, a substantially, vertically disposed rod movably secured to said rod members and extending upwardly at a point intermediate the ends thereof and between the wheels of said pair of wheels to form a driving handle by which the car can be manually propelled along a rail track, a brake shoe carried at the lower end of the rod, spring means urging said rod downwardly so as to force the brake shoe into contact with the rail upon which said pair of wheels roll, and means for selectively locking said rod in an upwardly retracted position.

2. A rail car as set forth in claim 1 and further comprising a lateral rod-like crosspiece connected to said rod members at points intermediate the lengths thereof to extend laterally from one side of the car, a third wheel mounted on said crosspiece with its axis of rotation parallel to the axes of said pair of wheels, and means for adjusting the lateral spacing of said third wheel from said pair of wheels, the lowermost point of the circumference of said third wheel is at a higher level than the lowermost points of the circumferences of said pair of wheels when said horizontally disposed members are horizontal, whereby the longitudinal platform will have an inclination toward said third wheel when the car is mounted on the rails of a level track.

References Cited by the Examiner

UNITED STATES PATENTS

| | | | |
|---|---|---|---|
| 260,903 | 7/1882 | Sheffield | 105—87 |
| 446,714 | 2/1891 | Roberts | 105—87 |
| 530,113 | 12/1894 | Mather | 105—162 |
| 950,784 | 3/1910 | Neff | 219—53 |
| 1,606,471 | 11/1926 | Kastler | 105—162 |
| 1,907,646 | 5/1933 | Gross | 105—162 |
| 2,126,336 | 8/1938 | Mall | 105—162 |
| 2,253,363 | 8/1941 | Chandler | 105—162 |
| 2,401,316 | 6/1946 | Richards | 105—162 |
| 2,661,428 | 12/1953 | Aversten | 290—1 |
| 2,837,033 | 6/1958 | Godfrey et al. | 105—162 |
| 2,866,076 | 12/1958 | Aversten | 219—98 |

ARTHUR L. LA POINT, *Primary Examiner.*

RICHARD M. WOOD, LEO QUACKENBUSH, MILTON BUCHLER, *Examiners.*